(12) United States Patent
Ouyang

(10) Patent No.: US 9,966,851 B2
(45) Date of Patent: May 8, 2018

(54) BUCK-BOOST CONVERTER, THE CONTROL CIRCUIT AND THE METHOD THEREOF

(71) Applicant: Monolithic Power Systems, Inc., San Jose, CA (US)

(72) Inventor: Qian Ouyang, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 5 days.

(21) Appl. No.: 15/087,944

(22) Filed: Mar. 31, 2016

(65) Prior Publication Data

US 2016/0315535 A1 Oct. 27, 2016

(30) Foreign Application Priority Data

Apr. 24, 2015 (CN) .......................... 2015 1 0198639

(51) Int. Cl.
*H02M 3/158* (2006.01)
*H02M 1/00* (2006.01)

(52) U.S. Cl.
CPC .. *H02M 3/1582* (2013.01); *H02M 2001/0022* (2013.01)

(58) Field of Classification Search
CPC ....... H02M 3/1582; H02M 2001/0022; H02M 3/157; H02M 3/158
USPC .......................................................... 323/271
See application file for complete search history.

(56) References Cited

U.S. PATENT DOCUMENTS

| | | | | |
|---|---|---|---|---|
| 2002/0186574 A1* | 12/2002 | Sato | ...................... | H02M 3/073 363/60 |
| 2010/0039086 A1* | 2/2010 | De Stegge | .......... | H02M 3/1582 323/282 |
| 2011/0037446 A1* | 2/2011 | Engelhardt | ......... | H02M 3/1582 323/282 |
| 2012/0062030 A1* | 3/2012 | Xu | ...................... | H02M 3/1582 307/31 |
| 2014/0217996 A1* | 8/2014 | Peker | .................. | H02M 3/1582 323/271 |
| 2014/0285170 A1 | 9/2014 | Deng | | |
| 2014/0354250 A1 | 12/2014 | Deng | | |

* cited by examiner

*Primary Examiner* — Fred E Finch, III
*Assistant Examiner* — Lorena Bruner
(74) *Attorney, Agent, or Firm* — Perkins Coie LLP

(57) ABSTRACT

A buck-boost converter automatically chooses work mode between buck mode, boost mode and buck-boost mode, in response to an input voltage and an output voltage. The buck-boost converter is with simple structure, convenient mode transition and lower output voltage ripple.

6 Claims, 9 Drawing Sheets

BUCK-BOOST CONVERTER, THE CONTROL CIRCUIT AND THE METHOD THEREOF

CROSS-REFERENCE TO RELATED APPLICATIONS

This application claims priority to and the benefit of Chinese Patent Application No. 201510198639.X, filed on Apr. 24, 2015, which is incorporated herein by reference in its entirety.

FIELD

The present invention relates generally to electronic circuits, and more particularly but not exclusively to switching converters and the method thereof.

BACKGROUND

A buck-boost converter converts an input voltage to an output voltage, and may work under buck mode, boost mode or buck-boost mode. Usually, the buck-boost converter works under buck mode when the input voltage is higher than the output voltage, works under boost mode when the input voltage is lower than the output voltage and works under buck-boost mode when the input voltage is close to the output voltage.

FIG. 1 schematically shows a prior art buck-boost converter 10. In the example of FIG. 1, duty cycles of the power switches PA~PD are controlled by an error amplified signal Vcom. As a result, the ripple and noise of the error amplified signal Vcom will cause switching ripple of the output voltage Vout during mode transition and under buck-boost mode. Meanwhile, under light load, the efficiency of the buck-boost converter 10 is very low, and the mode transition is slow which resulted in a large output voltage ripple. Furthermore, the control circuit of the buck-boost converter 10 which is partly shown in FIG. 1 is very complicated.

SUMMARY

It is an object of the present invention to provide a buck-boost converter with simple structure, convenient mode transition and lower output voltage ripple.

In accomplishing the above and other objects, there has been provided, in accordance with an embodiment of the present invention, a buck-boost converter, comprising: an input port configured to receive an input voltage; an output port configured to provide an output voltage; a pair of buck switches having a first power switch and a second power switch coupled in series between the input port and a ground reference; a pair of boost switches having a third power switch and a fourth power switch coupled in series between the output port and the ground reference; a mode select circuit configured to receive the input voltage and the output voltage, and based on the input voltage and the output voltage, the mode select circuit generates a buck enable signal, a boost enable signal and a buck-boost enable signal; a mode control circuit configured to receive a feedback signal indicative of the output voltage, a reference signal, the buck enable signal, the boost enable signal and the buck-boost enable signal, and based on the feedback signal, the reference signal, the buck enable signal, the boost enable signal and the buck-boost enable signal, the mode control circuit generates a first buck control signal, a second buck control signal, a first boost control signal and a second boost control signal; and a logic circuit configured to receive the first buck control signal, the second buck control signal, the first boost control signal and the second boost control signal, and based on the buck control signals and the boost control signals, the logic circuit generates a first switch control signal, a second switch control signal, a third switch control signal and a fourth switch control signal to respectively control the operation of the first power switch, the second power switch, the third power switch and the fourth power switch, so as to control the output voltage.

There has been provided, in accordance with an embodiment of the present disclosure, a control circuit for a buck-boost converter, wherein the buck-boost converter comprises an input port receiving an input voltage, an output port providing an output voltage, a first power switch, a second power switch, a third power switch and a fourth power switch, the control circuit comprising: a mode select circuit configured to receive the input voltage and the output voltage, and based on the input voltage and the output voltage, the mode select circuit generates a buck enable signal, a boost enable signal and a buck-boost enable signal; a mode control circuit configured to receive a feedback signal indicative of the output voltage, a reference signal, the buck enable signal, the boost enable signal and the buck-boost enable signal, and based on the feedback signal, the reference signal, the buck enable signal, the boost enable signal and the buck-boost enable signal, the mode control circuit generates a first buck control signal, a second buck control signal, a first boost control signal and a second boost control signal; and a logic circuit configured to receive the first buck control signal, a second buck control signal, a first boost control signal and a second boost control signal, and based on the buck control signals and the boost control signals, the logic circuit generates a first switch control signal, a second switch control signal, a third switch control signal and a fourth switch control signal to respectively control the operation of the first power switch, the second power switch, the third power switch and the fourth power switch, so as to control the output voltage.

There has been provided, in accordance with an embodiment of the present disclosure, a control method used for a buck-boost converter, wherein the buck-boost converter comprises a first power switch, a second power switch, a third power switch and a fourth power switch, and the buck-boost converter has a switching period, the control method comprising: setting the work mode based on the input voltage at an input port and the output voltage at an output port of the buck-boost converter; keeping the buck-boost converter working under buck mode when the input voltage is higher than the output voltage, wherein the fourth power switch is on and the third power switch is off, meanwhile, the first power switch and the second power switch are turned on and off alternatively to transfer energy from the input port to the output port; keeping the buck-boost converter working under boost mode when the input voltage is lower than the output voltage, wherein the first power switch is on and the second power switch is off, meanwhile, the third power switch and the fourth power switch are turned on and off alternatively to transfer energy from the input port to the output port; and keeping first power switch and the second power switch working under buck mode for every switching period, and keeping the third power switch and the fourth power switch working under boost mode for a preset time period during every switching period of the buck-boost converter.

The use of the same reference label in different drawings indicates the same or like components.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
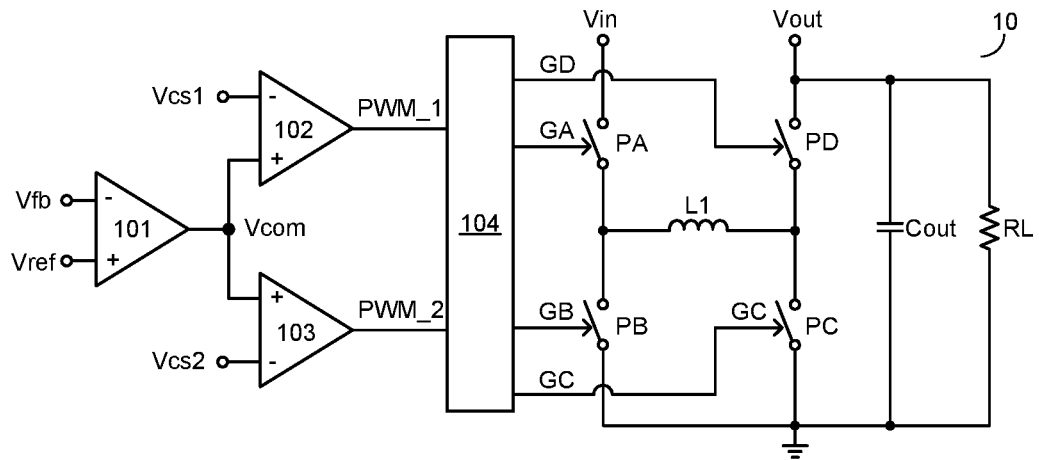
FIG. 1 schematically shows a prior art buck-boost converter 10.
Figure 2:
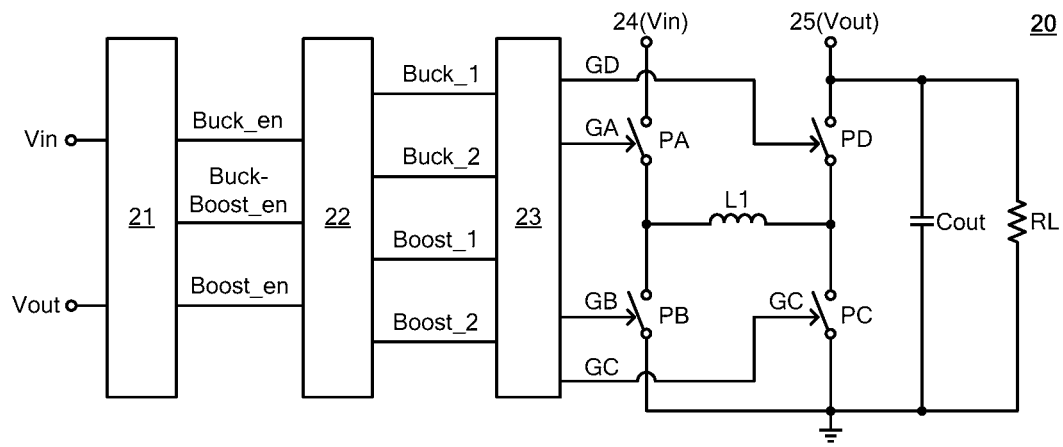
FIG. 2 schematically shows a buck-boost converter 20 in accordance with an embodiment of the present invention.

FIG. 2 schematically shows a buck-boost converter 20 in accordance with an embodiment of the present invention. As shown in FIG. 2, the buck-boost converter 20 comprises: an input port 24 configured to receive an input voltage Vin, an output port 25 configured to provide an output voltage Vout; a pair of buck switches having a first power switch PA and a second power switch PB coupled in series between the input port 24 and a ground reference; a pair of boost switches having a third power switch PC and a fourth power switch PD coupled in series between the output port 25 and the ground reference; an inductor L1 coupled between a connection node of the buck switches PA, PB and a connection node of the boost switches PC, PD; a mode select circuit 21 configured to receive the input voltage Vin and the output voltage Vout, and based on the input voltage Vin and the output voltage Vout, the mode select circuit 21 generates a buck enable signal Buck_en, a boost enable signal Boost_en and a buck-boost enable signal Buck-Boost_en, a mode control circuit 22 configured to receive a feedback signal Vfb indicative of the output voltage Vout, a reference signal Vref, the buck enable signal Buck_en, the boost enable signal Boost_en and the buck-boost enable signal Buck-Boost_en, and based on the feedback signal Vfb, the reference signal Vref, the buck enable signal Buck_en, the boost enable signal Boost_en and the buck-boost enable signal Buck-Boost_en, the mode control circuit 22 generates a first buck control signal Buck_1, a second buck control signal Buck_2, a first boost control signal Boost_1 and a second boost control signal Boost_2; and a logic circuit 23 configured to receive the first buck control signal Buck_1, a second buck control signal Buck_2, a first boost control signal Boost_1 and a second boost control signal Boost_2, and based on the buck control signals Buck_1, Buck_2 and the boost control signals Boost_1, Boost_2, the logic circuit 23 generates a first switch control signal GA, a second switch control signal GB, a third switch control signal GC and a fourth switch control signal GD to respectively control the operation of the first power switch PA, the second power switch PB, the third power switch PC and the fourth power switch PD, so as to control the output voltage Vout.

In one embodiment, the power switches PA~PD may comprise controllable semiconductor devices, for example, MOSFET (Metal Oxide Semiconductor Field Effect Transistor), BJT (Bipolar Junction Transistor) and so on.

Figure 3:
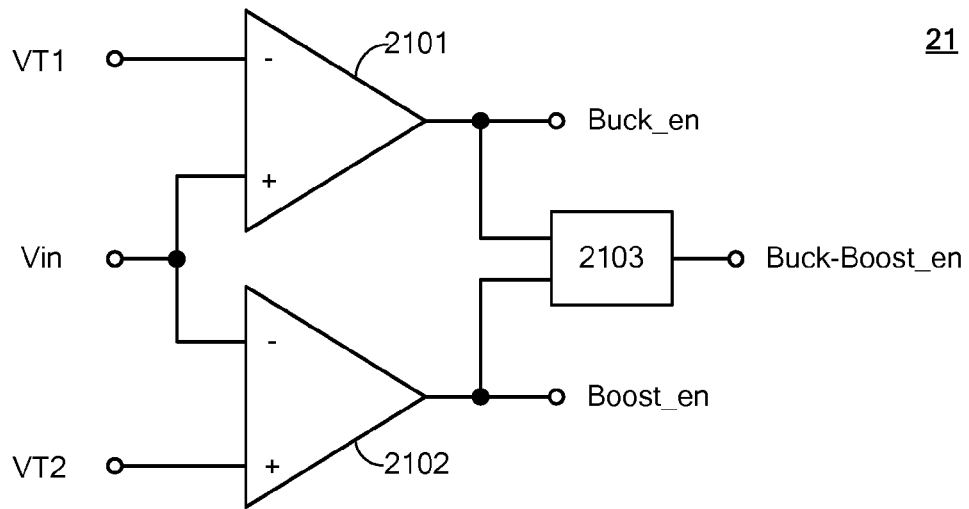
FIG. 3 schematically shows the mode select circuit 21 in accordance with an embodiment of the present invention.

FIG. 3 schematically shows the mode select circuit 21 in accordance with an embodiment of the present invention. In the example of FIG. 3, the mode select circuit 21 comprises: a first comparator 2101 having a first input terminal configured to receive a first voltage signal VT1 proportional to the output voltage Vout, a second input terminal configured to receive the input voltage Vin, and an output terminal configured to provide the buck enable signal Buck_en based on the first voltage signal VT1 and the input voltage Vin, a second comparator 2102 having a first input terminal configured to receive a second voltage signal VT2 proportional to the output voltage Vout, a second input terminal configured to receive an input voltage Vin, and an output terminal configured to provide the boost enable signal Boost_en based on the second voltage signal VT2 and the input voltage Vin, and a select logic circuit 2103 having a first input terminal coupled to the output terminal of the comparator 2101 to receive the buck enable signal Buck_en, a second input terminal coupled to the output terminal of the comparator 2102 to receive the boost enable signal Boost_en, and an output terminal configured to provide a buck-boost enable signal Buck-Boost_en based on the buck enable signal Buck_en and the boost enable signal Boost_en.

In one embodiment, the value of the first voltage signal VT1 is K1×Vout, and the value of the second voltage signal VT2 is K2×Vout. The value of the coefficient K1 is larger than 1, and the value of the coefficient K2 is larger than 0 and smaller than 1, i.e., K1>1 and 0<K2<1. In one embodiment, the first comparator 2101 and the second comparator 2102 comprise hysteresis comparators with a hysteresis window adjusted to applications.

In one embodiment, the inverting input terminal of the first comparator 2101 receives the first voltage signal VT1, and the non-inverting input terminal of the first comparator 2101 receives the input voltage Vin, the inverting input terminal of the second comparator 2102 receives the input voltage Vin, and the non-inverting input terminal receives the second voltage signal VT2. The select logic circuit 2103 comprises a NOR gate. When the input voltage Vin is larger than or equal to K1×Vout, the buck enable signal Buck_en generated by the first comparator 2101 becomes logical high, i.e., the buck enable signal Buck_en is valid, and the buck-boost converter 20 works under buck mode; when the value of the input voltage Vin is smaller than or equal to K2×Vout, the boost enable signal Boost_en becomes logical high, i.e., the boost enable signal Boost_en is valid, and the buck-boost converter 20 works under boost mode; when the value of the input voltage Vin is between K1×Vout and K2×Vout, the buck enable signal Buck_en and the boost enable signal Boost_en are both logical low while the buck-boost enable signal Buck-Boost_en generated by the logic circuit 2103 becomes logical high, i.e., the buck-boost enable signal Buck-Boost_en is valid, and the buck-boost converter 20 works under buck-boost mode.

Persons of ordinary skill in the art should know that, the buck enable signal Buck_en, the boost enable signal Boost_en, and the buck-boost enable signal Buck-Boost_en may be the valid with other logical states in other embodiments. For example, when the non-inverting input terminal of the comparator 2101 receives the voltage signal VT1, the inverting input terminal of the comparator 2101 receives the input voltage Vin, the non-inverting input terminal of the comparator 2102 receives the input voltage Vin, the inverting input terminal of the comparator 2102 receives the voltage signal VT2, and the logic circuit 2103 comprises a NAND gate, the buck enable signal Buck_en, the boost enable signal Boost_en and the buck-boost enable signal Buck-Boost_en are valid when being logical low. Furthermore, the buck enable signal Buck_en, the boost enable signal Boost_en and the buck-boost enable signal Buck-Boost_en may have different logic states when they are valid. In all the embodiments of the present invention, there is only one of the buck enable signal, boost enable signal or buck-boost enable signal is valid in any time period.

Figure 4:
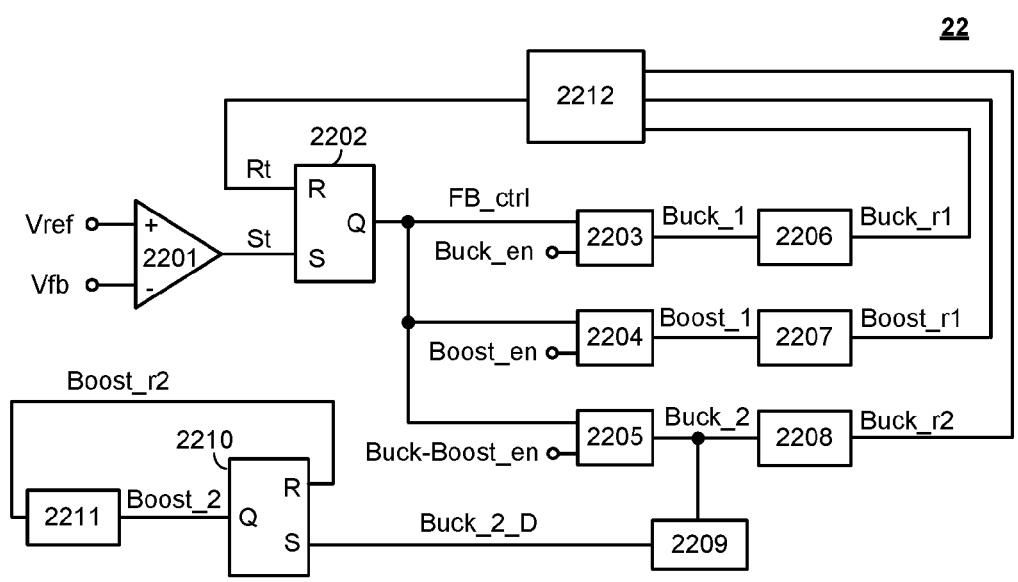
FIG. 4 schematically shows the mode control circuit 22 in accordance with an embodiment of the present invention.

FIG. 4 schematically shows the mode control circuit 22 in accordance with an embodiment of the present invention. In the example of FIG. 4, the mode control circuit 22 comprises: a feedback comparator 2201, having a first input terminal (the non-inverting input terminal) configured to receive a reference signal Vref, a second input terminal (the inverting input terminal) configured to receive the feedback signal Vfb indicative of the output voltage Vout, and an output terminal configured to provide a set signal St based on the reference signal Vref and the feedback signal Vfb; a first RS flip-flop 2202 having a reset terminal "R" configured to receive a reset signal Rt, a set terminal "S" coupled to the output terminal of the feedback comparator 2201 to receive the set signal St, and an output terminal "Q" configured to provide a feedback control signal FB_ctrl based on the set signal St and the reset signal Rt; a first enable logic circuit 2203 having a first input terminal coupled to the output terminal "Q" of the first RS flip-flop 2202 to receive the feedback control signal FB_ctrl, a second input terminal configured to receive the buck enable signal Buck_en, and an output terminal configured to provide a first buck control signal Buck_1 based on the feedback control signal FB_ctrl and the buck enable signal Buck_en; a second enable logic circuit 2204 having a first input terminal coupled to the output terminal "Q" of the first RS flip-flop 2202 to receive the feedback control signal FB_ctrl, a second input terminal configured to receive the boost enable signal Boost_en, and an output terminal configured to provide a first boost control signal Boost_1 based on the feedback control signal FB_ctrl and the boost enable signal Boost_en; a third enable logic circuit 2205 having a first input terminal coupled to the output terminal "Q" of the first RS flip-flop 2202 to receive the feedback control signal FB_ctrl, a second input terminal configured to receive the buck-boost enable signal Buck-Boost_en, and an output terminal configured to provide a second buck control signal Buck_2 based on the feedback control signal FB_ctrl and the buck-boost enable signal Buck-Boost_en; a first constant on time circuit 2206 having an input terminal coupled to the output terminal of the first enable logic circuit 2203 to receive the first buck control signal Buck_1, and an output terminal configured to provide a first buck reset signal Buck_r1 based on the first buck control signal Buck_1; a second constant on time circuit 2207 having an input terminal coupled to the output terminal of the second enable logic circuit 2204 to receive the first boost control signal Boost_1, and an output terminal configured to provide a first boost reset signal Boost_r1 based on the first boost control signal Boost_1; a third constant on time circuit 2208 having an input terminal coupled to the output terminal of the third enable logic circuit 2205 to receive the second buck control signal Buck_2, and an output terminal configured to provide a second buck reset signal Buck_r2 based on the second buck control signal Buck_2; a delay circuit 2209 having an input terminal coupled to the output terminal of the third enable logic circuit 2205 to receive the second buck control signal Buck_2, and an output terminal configured to provide a delay signal Buck_2_D being delayed for a delay time length D1 compared to the second buck control signal Buck_2; a second RS flip-flop 2210 having a set terminal "S" coupled to the output terminal of the delay circuit 2209 to receive the delay signal Buck_2_D, a reset terminal "R" and an output terminal "Q" coupled together, and wherein the output terminal "Q" provides a second boost reset signal Boost_r2; and a reset logic circuit 2212 having a first input terminal coupled to the output terminal of the first constant on time circuit 2206 to receive the first buck reset signal Buck_r1, a second input terminal coupled to the output terminal of the second constant on time circuit 2207 to receive the first boost reset signal Boost_r1, a third input terminal coupled to the output terminal of the constant on time circuit 2208 to receive the second buck reset signal Buck_r2, and an output terminal configured to provide the reset signal Rt based on the first buck reset signal Buck_r1, the second buck reset signal Buck_r2 and the first boost reset signal Boost_r1; wherein the reset terminal "R" of the first RS flip-flop 2202 is coupled to the output terminal of the reset logic circuit 2212 to receive the reset signal Rt.

In one embodiment, the feedback signal Vfb is compensated before being provided to the feedback comparator 2201.

In one embodiment, the first RS flip-flop 2202 and the second RS flip-flop 2210 comprise RS flip-flops trigged by pulses.

In one embodiment, the enable logic circuits 2203, 2204 and 2205 comprise AND gate. When the buck enable signal Buck_en is valid, the boost enable signal Boost_en and the buck-boost enable signal Buck-Boost_en are invalid, the buck-boost converter 20 works under buck mode. Under buck mode, the fourth power switch PD keeps on and the third power switch PC keeps off, while the buck switches PA and PB are turned on and off alternatively by the first buck control signal Buck_1 so as to control the energy transferred from the input port 24 to the output port 25 of the buck-boost converter.

Figure 5:
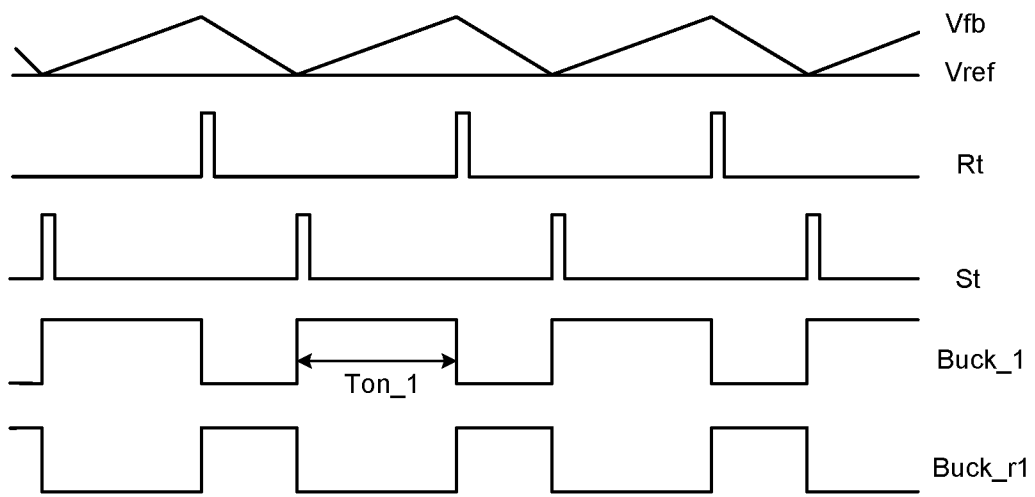
FIG. 5 shows waveforms of signals of the buck-boost converter 20 working under buck mode.

FIG. 5 shows waveforms of signals of the buck-boost converter 20 working under buck mode. The operation of the buck-boost converter 20 under buck mode is explained with reference to FIGS. 4 and 5. As shown in FIG. 5, when the feedback signal Vfb decreases to the reference signal Vref, the feedback comparator 2201 generates the set signal St to set the first RS flip-flop 2202 to generate a logical high feedback control signal FB_ctrl. Because the buck enable signal Buck_en is logical high, the first buck control signal Buck_1 has similar waveform with the feedback control signal FB_ctrl. The first constant on time circuit 2206 generates the first buck reset signal Buck_r1 based on the first buck control signal Buck_1, wherein the first buck reset signal Buck_r1 has a first constant on time period Ton_1 during each switching period. In one embodiment, the first buck reset signal Buck_r1 is logical low during the first constant on time period Ton_1, and is logical high during other time periods. During the first constant on time period Ton_1, the first buck control signal Buck_1 is logical high. Thus the first power switch PA is on and the second power switch PB is off. As a result, the feedback signal Vfb increases. After the first constant on time period Ton_1, the first buck reset signal Buck_r1 resets the first RS flip-flop 2202 via the reset logic circuit 2212. As a result, the feedback control signal FB_ctrl and the first buck control signal Buck_1 become logical low. Thus the first power switch PA is off and the second power switch PB is on. As a result, the feedback signal Vfb decreases. The first RS flip-flop 2202 will be set again when the feedback signal Vfb decreases to the reference signal Vref again. Then the feedback control signal FB_ctrl and the first buck control signal Buck_1 become logical high again and the operation repeats.

When the boost enable signal Boost_en is valid, the buck enable signal Buck_en and the buck-boost enable signal buck_Boost_en are invalid, the buck-boost converter 20 works under boost mode. Under boost mode, the first power switch PA keeps on and the second power switch PB keeps off, while the boost switches PC and PD are turned on and off alternatively by the first boost control signal Boost_1, so as to transfer energy from the input port 24 to the output port 25 of the buck-boost converter.

Figure 6:
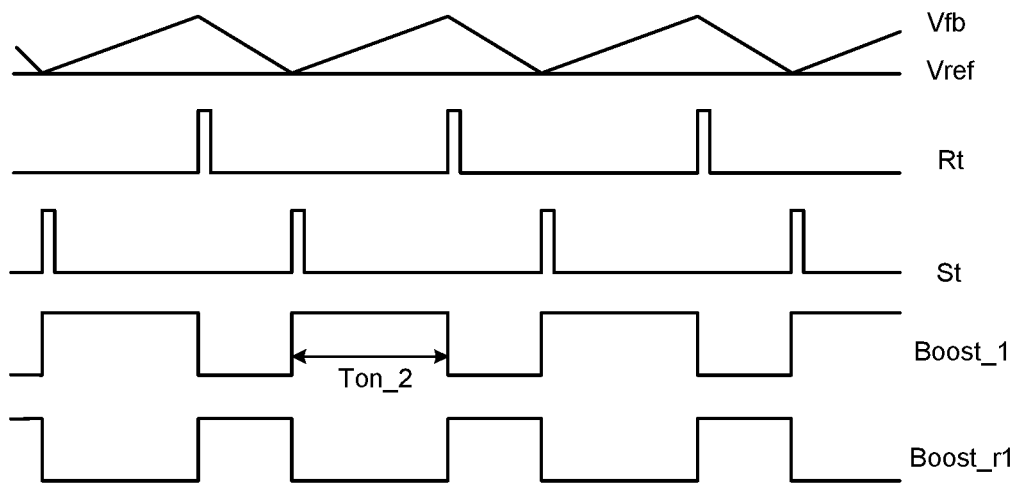
FIG. 6 shows waveforms of the signals of the buck-boost converter 20 working under boost mode.

FIG. 6 shows waveforms of the signals of the buck-boost converter 20 working under boost mode. The operation of the buck-boost converter 20 under boost mode is explained with reference to FIGS. 4 and 6. As shown in FIG. 6, when the feedback signal Vfb decreases to the reference signal Vref, the feedback comparator 2201 generates the set signal St to set the first RS flip-flop 2202 to generate a logical high feedback control signal FB_ctrl. Because the boost enable signal Boost_en is logical high, the first boost control signal Boost_1 has similar waveform with the feedback control signal FB_ctrl. The second constant on time circuit 2207 generates the first boost reset signal Boost_r1 based on the first boost control signal Boost_1, wherein the first boost reset signal Boost_r1 has a second constant on time period Ton_2 during each switching period. In one embodiment, the first boost reset signal Boost_r1 is logical low during the second constant on time period Ton_2, and is logical high during other time periods. During the second constant on time period Ton_2, the first boost control signal Boost_1 is logical high. Thus the third power switch PC is on and the fourth power switch PD is off. As a result, the feedback signal Vfb increases. After the second constant on time period Ton_2, the first boost control signal Boost_1 resets the first RS flip-flop 2202 via the reset logic circuit 2212. As a result, the feedback control signal FB_ctrl and the first boost control signal Boost_1 become logical low. Thus the third power switch PC is off and the fourth power switch PD is on. As a result, the feedback signal Vfb decreases. The first RS flip-flop 2202 will be set when the feedback signal Vfb decreases to the reference signal Vref again. Then the feedback control signal FB_ctrl and the first boost control signal Boost_1 become logical high again and the operation repeats.

When the buck-boost enable signal Buck-Boost_en is valid, the buck enable signal Buck_en and the boost enable signal Boost_en are invalid, the buck-boost converter 20 works under buck-boost mode. The buck-boost mode is a combination of the buck mode and the boost mode in the embodiments of the present invention. Under buck-boost mode, the buck switches PA and PB works under buck mode while the boost switches PC and PD works under boost mode. The buck switches PA and PB are controlled by the second buck control signal Buck_2 while the boost switches PC and PD are controlled by the second boost control signal Boost_2.

Figure 7:
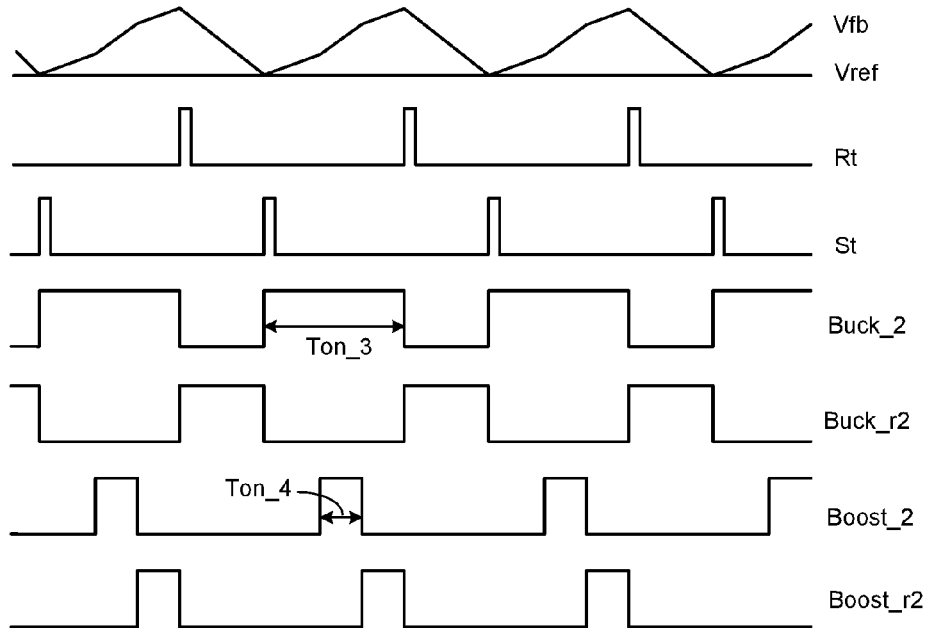
FIG. 7 shows waveforms of signals of the buck-boost converter 20 under buck-boost mode.

FIG. 7 shows waveforms of signals of the buck-boost converter 20 under buck-boost mode. The operation of the buck-boost converter 20 under buck-boost mode will be explained with reference to FIGS. 4 and 7. As shown in FIG. 7, when the feedback signal Vfb decreases to the reference signal Vref, the feedback comparator 2201 generates the set signal St to set the first RS flip-flop 2202 to generate a logical high feedback control signal FB_ctrl. Because the buck-boost enable signal Buck-Boost_en is logical high, the second buck control signal Buck_2 has similar waveform with the feedback control signal FB_ctrl. The third constant on time circuit 2208 generates the second buck reset signal Buck_r2 based on the second buck control signal Buck_2, wherein the second buck reset signal Buck_r2 has a third constant on time period Ton_3 during each switching period. In one embodiment, the second buck reset signal Buck_r2 is logical low during the third constant on time period Ton_3, and is logical high during other time periods. During the third constant on time period Ton_3, the second buck control signal Buck_2 is logical high. Thus the first power switch PA is on and the second power switch PB is off. As a result, the feedback signal Vfb increases. After the third constant on time period Ton_3, the second buck reset signal Buck_r2 resets the first RS flip-flop 2202 via the reset logic circuit 2212. As a result, the feedback control signal FB_ctrl and the second buck control signal Buck_2 become logical low. Thus the first power switch PA is off and the second power switch PB is on. As a result, the feedback signal Vfb decreases. Meanwhile, under buck-boost mode, the delay circuit 2209 receives the second buck control signal Buck_2 and provides a delay signal Buck_2_D. The delay signal Buck_2_D sets the second RS flip-flop 2210 at the moment having a delay time length of D from the starting of the third constant on time period Ton_3, so as to generate the second boost control signal Boost_2 with logical high state. The fourth constant on time circuit 2211 generates the second boost reset signal Boost_r2 based on the second boost control signal Boost_2, wherein the boost reset signal Boost_r2 has a fourth constant on time period Ton_4 during each switching period. In one embodiment, the second boost reset signal Boost_r2 is logical low during the fourth constant on time period Ton_4, and is logical high during other time periods. During the fourth constant on time period Ton_4, the second boost control signal Boost_2 is logical high. Thus, the third power switch PC is on and the fourth power switch PD is off. During the time period other than the fourth constant on time period Ton_4, the fourth power switch PD is on and the third power switch PC is off, as shown in FIG. 7. The first RS flip-flop 2202 will be set when the feedback signal Vfb decreases to the reference signal Vref again. Then the feedback control signal FB_ctrl and the second buck control signal Buck_2 become logical high again and the operation repeats.

In one embodiment, the delay time length D1 is half of the switching period of the buck-boost converter. In one embodiment, the fourth constant on time period Ton_4 begins after the beginning of the third constant on time period Ton_3, and ends before the ending of the third constant on time period Ton_3.

Figure 8:
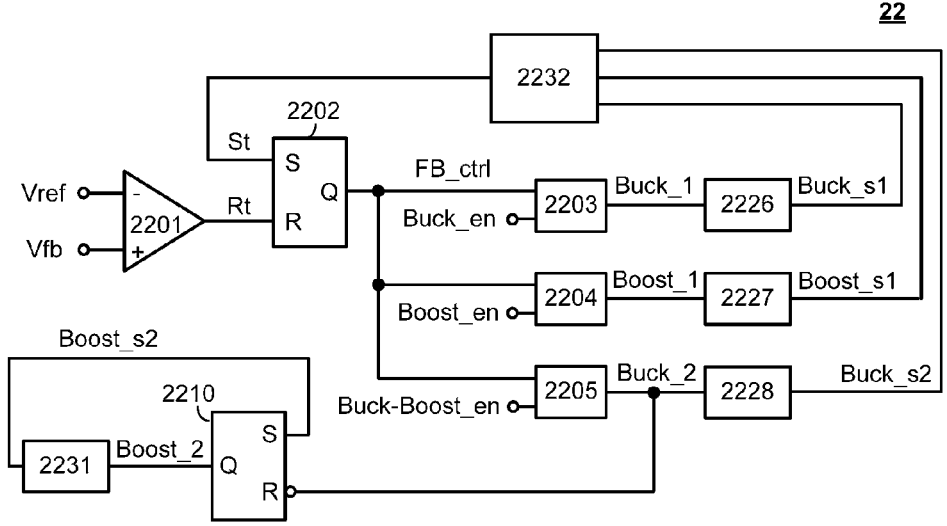
FIG. 8 schematically shows a mode control circuit 22 in accordance with an embodiment of the present invention.

FIG. 8 schematically shows a mode control circuit 22 in accordance with an embodiment of the present invention. In the example of FIG. 8, the mode control circuit 22 comprises: a feedback comparator 2201, having a first input terminal (the non-inverting input terminal) configured to receive the reference signal Vref, a second input terminal (the inverting input terminal) configured to receive the feedback signal indicative of the output voltage Vout, and an output terminal configured to provide a reset signal Rt based on the reference signal Vref and the feedback signal Vfb; a first RS flip-flop 2202 having a reset terminal "R" coupled to the output terminal of the feedback comparator 2201 to receive the reset signal Rt, a set terminal "S" configured to receive a set signal St, and an output terminal "Q" configured to provide a feedback control signal FB_ctrl based on the set signal St and the reset signal Rt; a first enable logic circuit 2203 having a first input terminal coupled to the output terminal "Q" of the first RS flip-flop 2202 to receive the feedback control signal FB_ctrl, a second input terminal configured to receive the buck enable signal Buck_en, and an output terminal configured to provide a first buck control signal Buck_1 based on the feedback control signal FB_ctrl and the buck enable signal Buck_en, a second enable logic circuit 2204 having a first input terminal coupled to the output terminal "Q" of the first RS flip-flop 2202 to receive the feedback control signal FB_ctrl, a second input terminal configured to receive the boost enable signal Boost_en, and an output terminal configured to provide a first boost control signal Boost_1 based on the feedback control signal FB_ctrl and the boost enable signal Boost_en; a third enable logic circuit 2205 having a first input terminal coupled to the output terminal "Q" of the first RS flip-flop 2202 to receive the feedback control signal FB_ctrl, a second input terminal configured to receive the buck-boost enable signal Buck-Boost_en, and an output terminal configured to provide a second buck control signal Buck_2 based on the feedback control signal FB_ctrl and the buck-boost enable signal Buck-Boost_en; a first constant off time circuit 2226 having an input terminal coupled to the output terminal of the first enable logic circuit 2203 to receive the first buck control signal Buck_1, and an output terminal configured to provide a first buck set signal Buck_s1 based on the first buck control signal Buck_1; a second constant off time circuit 2227 having an input terminal coupled to the output terminal of the second enable logic circuit 2204 to receive the first boost control signal Boost_1, and an output terminal configured to provide a first boost set signal Boost_s1 based on the first boost control signal Boost_1; a third constant off time circuit 2228 having an input terminal coupled to the output terminal of the third enable logic circuit 2205 to receive the second buck control signal Buck_2, and an output terminal configured to provide a second buck set signal Buck_s2 based on the second buck control signal Buck_2; a second RS flip-flop 2210 having a reset terminal "R" coupled to the output terminal of the third enable logic circuit 2205 to receive the second buck control signal Buck_2, and an output terminal "Q" provides a second boost control signal Boost_2; and a fourth constant off time circuit 2231 having an input terminal coupled to the output terminal "Q" of the second RS flip-flop 2210 to receive the second boost control signal Boost_2, and an output terminal configured to provide a boost set signal Boost_s2 based on the second boost control signal Boost_2; and a set logic circuit 2232 having a first input terminal coupled to the output terminal of the first constant off time circuit 2226 to receive the first buck set signal Buck_s1, a second input terminal coupled to the output terminal of the second constant off time control circuit 2227 to receive the first boost set signal Boost_s1, a third input terminal coupled to the output terminal of the third constant off time circuit 2228 to receive the second buck set signal Buck_s2, and an output terminal configured to provide the set signal St based on the first buck set signal Buck_s1, the second buck set signal Buck_s2 and the first boost set signal Boost_s1; wherein the second RS flip-flop 2210 further having a set terminal "S" coupled to the output terminal of the fourth constant off time circuit 2231 to receive the second boost set signal Boost_s2.

In one embodiment, the feedback signal Vfb is compensated before being provided to the feedback comparator 2201.

In one embodiment, the first RS flip-flop 2202 and the second RS flip-flop 2210 comprise RS flip-flops trigged by pulses.

In one embodiment, the enable logic circuit 2203, 2204 and 2205 comprise AND gate. When the buck enable signal Buck_en is valid, the boost enable signal Boost_en and the buck-boost enable signal buck_Boost_en are invalid, the buck-boost converter 20 works under buck mode. Under buck mode, the fourth power switch PD keeps on and the third power switch PC keeps off, while the buck switches PA and PB are turned on and off alternatively by the first buck control signal Buck_1 so as to control energy transferred from the input port 24 to the output port 25 of the buck-boost converter.

Figure 9:
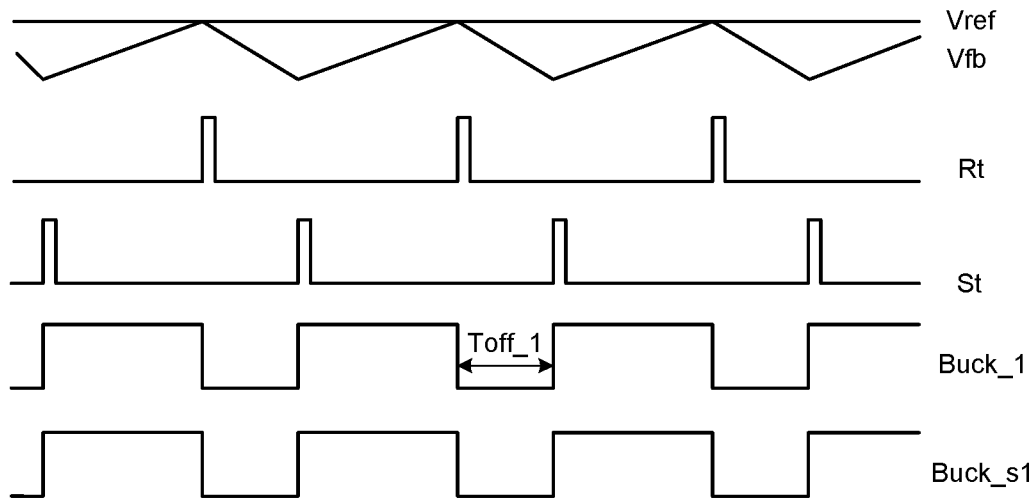
FIG. 9 shows waveforms of signals of the buck-boost converter 20 working under buck mode.

FIG. 9 shows waveforms of signals of the buck-boost converter 20 working under buck mode. The operation of the buck-boost converter 20 under buck mode is explained with reference to FIGS. 8 and 9. As shown in FIG. 9, when the feedback signal Vfb increases to the reference signal Vref, the feedback comparator 2201 generates the reset signal Rt to reset the first RS flip-flop 2202 to generate a logical low feedback control signal FB_ctrl. Because the buck enable signal Buck_en is logical high, the first buck control signal Buck_1 has similar waveform with the feedback control signal FB_ctrl. The first constant off time circuit 2226 generates the first buck set signal Buck_s1 based on the first buck control signal Buck_1, wherein the first buck set signal Buck_s1 has a first constant off time period Toff_1 during each switching period. In one embodiment, the first buck set signal Buck_s1 is logical high during the first constant off time period Toff_1, and is logical low during other time periods. During the first constant off time period Toff_1, the first buck control signal Buck_1 is logical low. Thus the first power switch PA is off and the second power switch PB is on. As a result, the feedback signal Vfb decreases. After the first constant off time period Toff_1, the first buck set signal Buck_s1 sets the first RS flip-flop 2202 via the set logic circuit 2232. As a result, the feedback control signal FB_ctrl and the first buck control signal Buck_1 become logical high. Thus the first power switch PA is on and the second power switch PB is off. As a result, the feedback signal Vfb increases. The first RS flip-flop 2202 will be reset when the feedback signal Vfb increases to the reference signal Vref again. Then the feedback control signal FB_ctrl and the first buck control signal Buck_1 becomes logical low again and the operation repeats.

When the boost enable signal Boost_en is valid, the buck enable signal Buck_en and the buck-boost enable signal buck_Boost_en are valid, the buck-boost converter 20 works under boost mode. Under boost mode, the first power switch PA keeps on and the second power switch PB keeps off, while the boost switches PC and PD are turned ON and off alternatively by the first boost control signal Boost_1, so as to transfer energy from the input port 24 to the output port 25 of the buck-boost converter.

Figure 10:
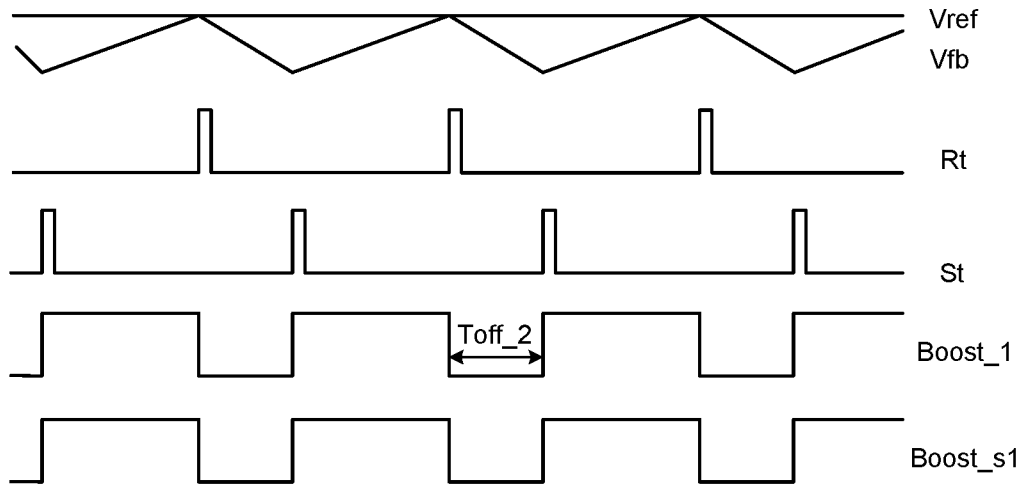
FIG. 10 shows waveforms of the signals of the buck-boost converter 20 working under boost mode.

FIG. 10 shows waveforms of the signals of the buck-boost converter 20 working under boost mode. The operation of the buck-boost converter 20 under boost mode is explained with reference to FIGS. 8 and 10. As shown in FIG. 10, when the feedback signal Vfb increases to the reference signal Vref, the feedback comparator 2201 generates the reset signal Rt to reset the first RS flip-flop 2202 to generate a logical low feedback control signal FB_ctrl. Because the boost enable signal Boost_en is logical high, the first boost control signal Boost_1 has similar waveform with the feedback control signal FB_ctrl. The second constant off time circuit 2227 generates the first boost set signal Boost_s1 based on the first boost control signal Boost_1, wherein the first boost set signal Boost_s1 has a second constant off time period Toff_2 during each switching period. In one embodiment, the first boost set signal Boost_s1 is logical high during the second constant off time period Toff_2, and is logical low during other time periods. During the second constant off time period Toff_2, the first boost control signal Boost_1 is logical low. Thus the third power switch PC is off and the fourth power switch PD is on. As a result, the feedback signal Vfb decreases. After the second constant off time period Toff_2, the first boost control signal Boost_1 sets the first RS flip-flop 2202 via the set logic circuit 2232. As a result, the feedback control signal FB_ctrl and the first boost control signal Boost_1 become logical high. Thus the third power switch PC is on and the fourth power switch PD is off. As a result, the feedback signal Vfb increases. The first RS flip-flop 2202 will be reset when the feedback signal Vfb increases to the reference signal Vref again. Then the feedback control signal FB_ctrl and the first boost control signal Boost_1 becomes logical low again and the operation repeats.

When the buck-boost enable signal Buck-Boost_en is valid, the buck enable signal Buck_en and the boost enable signal Boost_en are invalid, the buck-boost converter 20 works under buck-boost mode. The buck-boost mode is a combination of the buck mode and the boost mode in the embodiments of the present invention. Under buck-boost mode, the buck switches PA and PB works under buck mode while the boost switches PC and PD works under boost mode. The buck switches PA and PB are controlled by the second buck control signal Buck_1 while the boost switches PC and PD are controlled by the second boost control signal Boost_2.

Figure 11:
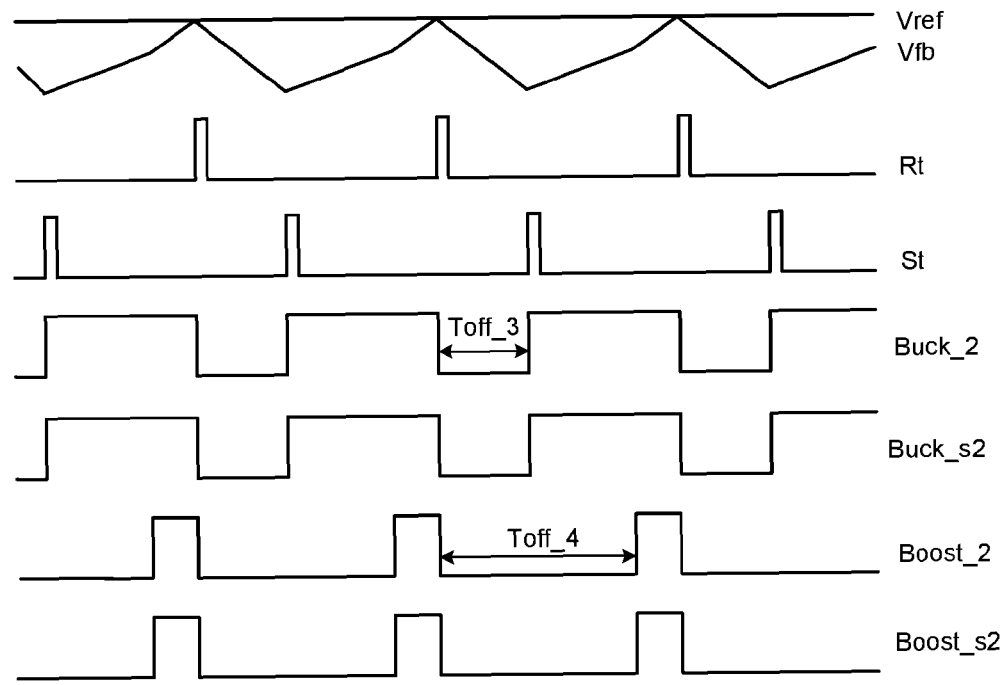
FIG. 11 shows waveforms of signals of the buck-boost converter 20 under buck-boost mode.

FIG. 11 shows waveforms of signals of the buck-boost converter 20 under buck-boost mode. The operation of the buck-boost converter 20 under buck-boost mode will be explained with reference to FIGS. 8 and 11. As shown in FIG. 11, when the feedback signal Vfb increases to the reference signal Vref, the feedback comparator 2201 generates the reset signal Rt to reset the first RS flip-flop 2202 to generate a feedback control signal FB_ctrl. Because the buck-boost enable signal Buck-Boost_en is logical high, the second buck control signal Buck_2 has similar waveform with the feedback control signal FB_ctrl. The third constant off time circuit 2228 generates the second buck set signal Buck_s2 based on the second buck control signal Buck_2, wherein the second buck set signal Buck_s2 has a third constant off time period Toff_3 during each switching period. In one embodiment, the second buck set signal Buck_s2 is logical high during the third constant off time period Toff_3, and is logical low during other time periods. During the third constant off time period Toff_3, the second buck control signal Buck_2 is logical low. Thus the first power switch PA is off and the second power switch PB is on. As a result, the feedback signal Vfb decreases. After the third constant off time period Toff_3, the second buck set signal Buck_s2 sets the first RS flip-flop 2202 via the set logic circuit 2232. As a result, the feedback control signal FB_ctrl and the second buck control signal Buck_2 become logical high. Thus, the first power switch PA is on and the second power switch PB is off. As a result, the feedback signal Vfb increases. Meanwhile, under buck-boost mode, the second RS flip-flop 2210 generates second boost control signal Boost_2 with logical low state based on the second buck control signal Buck_2 received at the reset terminal. The fourth constant off time circuit 2231 generates the second boost set signal Boost_s2 based on the second boost control signal Boost_2, wherein the boost set signal Boost_s2 has a fourth constant off time period Toff_4 during each switching period. In one embodiment, the second boost set signal Boost_s2 is logical high during the fourth constant off time period Toff_4, and is logical low during other time periods. During the fourth constant off time period Toff_4, the second boost control signal Boost_2 is logical low. Thus, the third power switch PC is off and the fourth power switch PD is on. During the time period other than the fourth constant on time period Toff_4, the fourth power switch PD is off and the third power switch PC is on, as shown in FIG. 11. The first RS flip-flop 2202 will be reset when the feedback signal Vfb increases to the reference signal Vref again. Then the feedback control signal FB_ctrl and the second buck control signal Buck_2 become logical low again and the operation repeats.

Constant on time circuits and constant off time circuits are familiar to persons of ordinary skill in the art, and are not described here.

Figure 12:
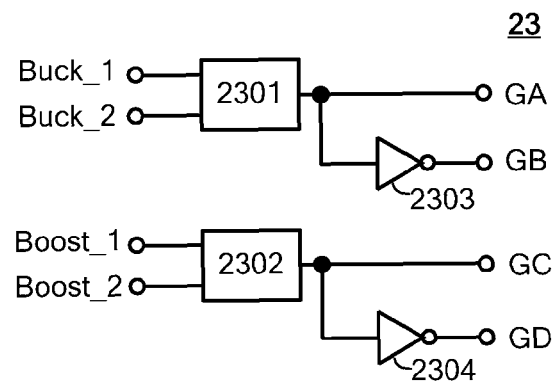
FIG. 12 schematically shows a logic circuit 23 in accordance with an embodiment of the present invention.

FIG. 12 schematically shows a logic circuit 23 in accordance with an embodiment of the present invention. As shown in FIG. 12, the logic circuit 23 comprises: a first gate circuit 2301 having a first input terminal configured to receive the first buck control signal Buck_1, a second input terminal configured to receive the second buck control signal Buck_2, and an output terminal configured to provide a first switch control signal GA based on the logical operation of the first buck control signal Buck_1 and the second buck control signal Buck_2, wherein the first switch control signal GA is valid when the first buck control signal Buck_1 is valid or the second buck control signal Buck_2 is valid; and a second gate circuit 2302 having a first input terminal configured to receive the first boost control signal Boost_1, a second input terminal configured to receive the second boost control signal Boost_2, and an output terminal configured to provide a third switch control signal GC based on the logical operation of the first boost control signal Boost_1 and the second boost control signal Boost_2, wherein the third switch control signal GC is valid when the first boost control signal Boost_1 is valid or the second boost control signal Boost_2 is valid; wherein: the first power switch PA is ON and the second power switch PB is off when the first switch control signal GA is valid; the third power switch PC is on and the fourth power switch PD is off when the third switch control signal GC is valid.

In one embodiment, the logic circuit 23 further comprise an inverse circuit 2303 having an input terminal configured to receive the first switch control signal GA, and an output terminal configured to provide a second switch control signal GB inverse to the first switch control signal GA; an inverse circuit 2304 having an input terminal configured to receive the third switch control signal GC, and an output terminal configured to provide a fourth switch control signal GD inverse to the fourth switch control signal GC.

In one embodiment, the first buck control signal Buck_1, the second buck control signal Buck_2, the first boost control signal Boost_1 and the second boost control signal Boost_2 are valid when being logical high. Meanwhile, the first gate circuit 2301 and the second gate circuit 2302 comprise OR gates. Furthermore, the switch control signals GA~GD are valid when being logical high too, and the power switches PA~PD are turned ON when the switch control signals GA~GD are valid.

Figure 13:
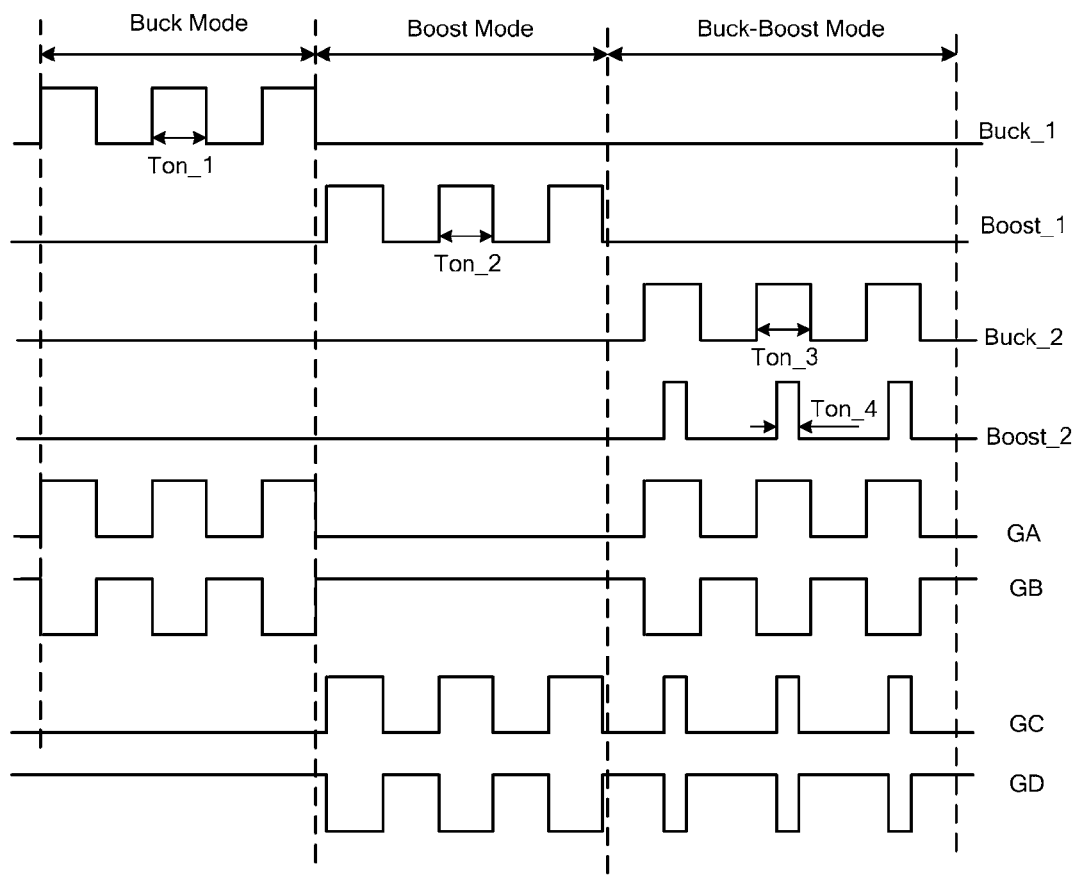
FIG. 13 shows waveforms of some signals of the circuits in FIGS. 4 and 12.

FIG. 13 shows waveforms of some signals of the circuits in FIGS. 4 and 12. As shown in FIG. 13, the buck enable signal Buck_en is valid under buck mode, thus the first buck control signal Buck_1 has the similar waveform with the feedback control signal FB_ctrl. After the OR operation of the first gate circuit 2301, the first switch control signal GA has a similar waveform with the first buck control signal Buck_1, and the second switch control signal GB is opposite to the first switch control signal GA. The boost enable signal Boost_en is valid under boost mode, thus the first boost control signal Boost_1 has the similar waveform with the feedback control signal FB_ctrl. After the OR operation of the second gate circuit 2302, the third switch control signal GC has a similar waveform with the first boost control signal Boost_1, and the fourth switch control signal GD is opposite to the third switch control signal GC. The buck-boost enable signal Buck-Boost_en is valid under buck-boost mode, thus the second buck control signal Buck_2 has the similar waveform with the feedback control signal FB_ctrl. After the OR operation of the first gate circuit 2301, the first switch control signal GA has a similar waveform with the first buck control signal Buck_1, and the second switch control signal GB is opposite to the first switch control signal GA. Meanwhile, as shown in FIG. 4, the second buck control signal Buck_2 sets the second RS flip-flop 2210 after the delay circuit 2209, to make the second boost control signal Boost_2 having a waveform shown in FIG. 13. The third switch control signal GC has a similar waveform with the second boost control signal Boost_2 after the OR operation of the second gate circuit 2302, and the fourth switch control signal GD has an opposite waveform with the third switch control signal GC.

Persons of ordinary skill in the art should know that the buck control signals Buck_1, Buck_2, the boost control signals Boost_1, Boost_2, and the switch control signals GA~GD may have different values as valid state. As a result, the logic circuit 23 may be different. For example, when the buck control signals Buck_1, Buck_2, and the boost control signals Boost_1, Boost_2 are valid when being logical low, the gate circuits 2301 and 2302 may comprise AND gates.

Figure 14:
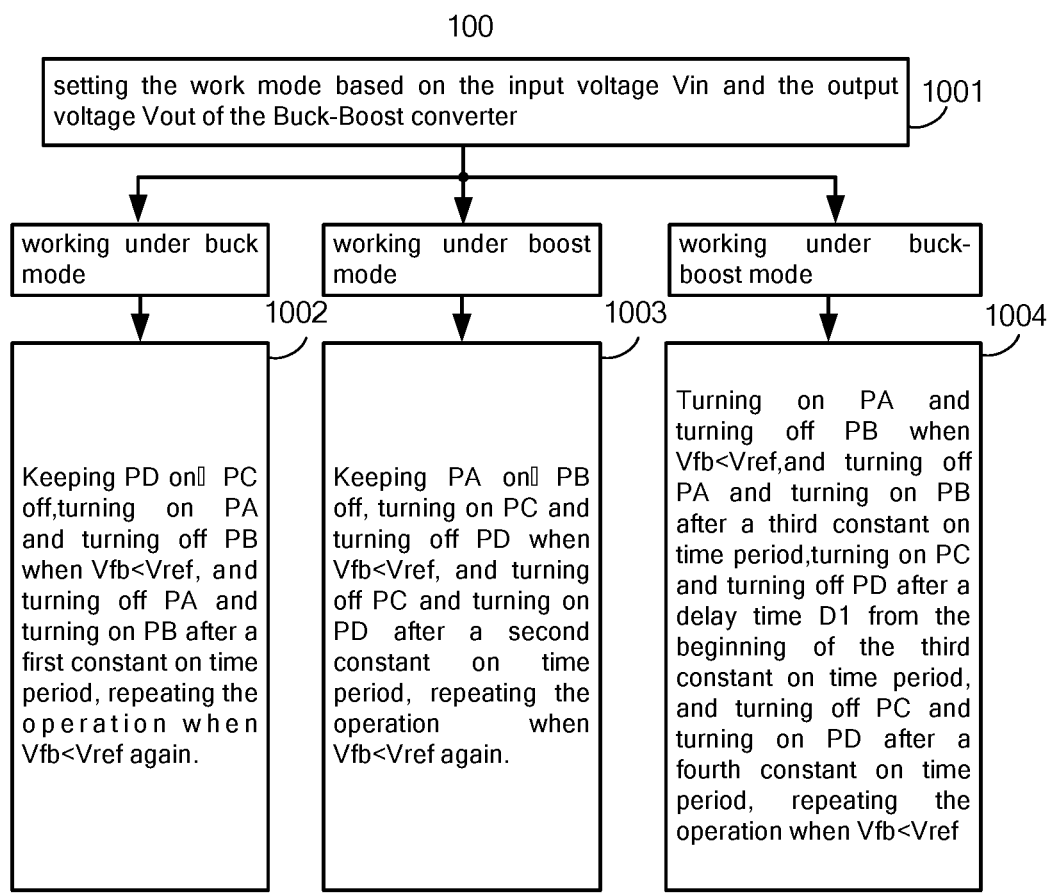
FIG. 14 shows a flow chart of a control method 100 for buck-boost converter in accordance with an embodiment of the present invention.

FIG. 14 shows a flow chart of a control method 100 for buck-boost converter in accordance with an embodiment of the present invention. The buck-boost converter may comprise the circuits in FIGS. 2, 3, 4, 8 and 12. The control method 100 comprises: step 1001, setting the work mode based on the input voltage Vin and the output voltage Vout of the buck-boost converter; step 1002, keeping the fourth power switch PD on and the third power switch PC off under buck mode, meanwhile: turning on the first power switch PA and turning off the second power switch PB when a feedback signal Vfb indicative of the output voltage Vout decreases to a reference signal Vref, and keeping the states of the first power switch PA and the second power switch PB unchanged for a first constant on time period; turning off the first power switch PA and turning on the second power switch PB after the first constant on time period; and repeating the operation when the feedback signal Vfb decreases to the reference signal Vref again; step 1003, keeping the first power switch PA on and the second power switch PB off under boost mode, meanwhile: turning on the third power switch PC and turning off the fourth power switch PD when the feedback signal Vfb indicative of the output voltage Vout decreases to the reference signal Vref, and keeping the states of the third power switch PC and the fourth power switch PD unchanged for a second constant on time period; turning off the third power switch PC and turning on the fourth power switch PD after the second constant on time period; and repeating the operation when the feedback signal Vfb decreases to the reference signal Vref again; step 1004, turning on the first power switch PA and turning off the second power switch PB when the feedback signal Vfb indicative of the output voltage Vout decreases to the reference signal Vref, and keep states of the first power switch PA and the second power switch PB unchanged for a third constant on time period meanwhile, the third power switch PC is off and the fourth power switch PD is on at this moment; turning on the third power switch PC and turning off the fourth power switch PD for a fourth constant on time period after a preset delay time length D1 from the beginning of the third constant on time period; turning off the first power switch PA and turning on the second power switch PB after the third constant on time period; and repeating the operation when the feedback signal Vfb decreases to the reference signal Vref again.

In one embodiment, the step 1001 comprises: entering the buck mode when the input voltage Vin is larger than the output voltage Vout; entering the boost mode when the input voltage Vin is smaller than the value of the output voltage Vout; entering the buck-boost mode when the input voltage Vin is close to the output voltage Vout.

In one embodiment, the delay time length D1 is half of the switching period.

In one embodiment, the fourth constant on time period begins later than the third constant on time period and ends before the third constant on time period.

Figure 15:
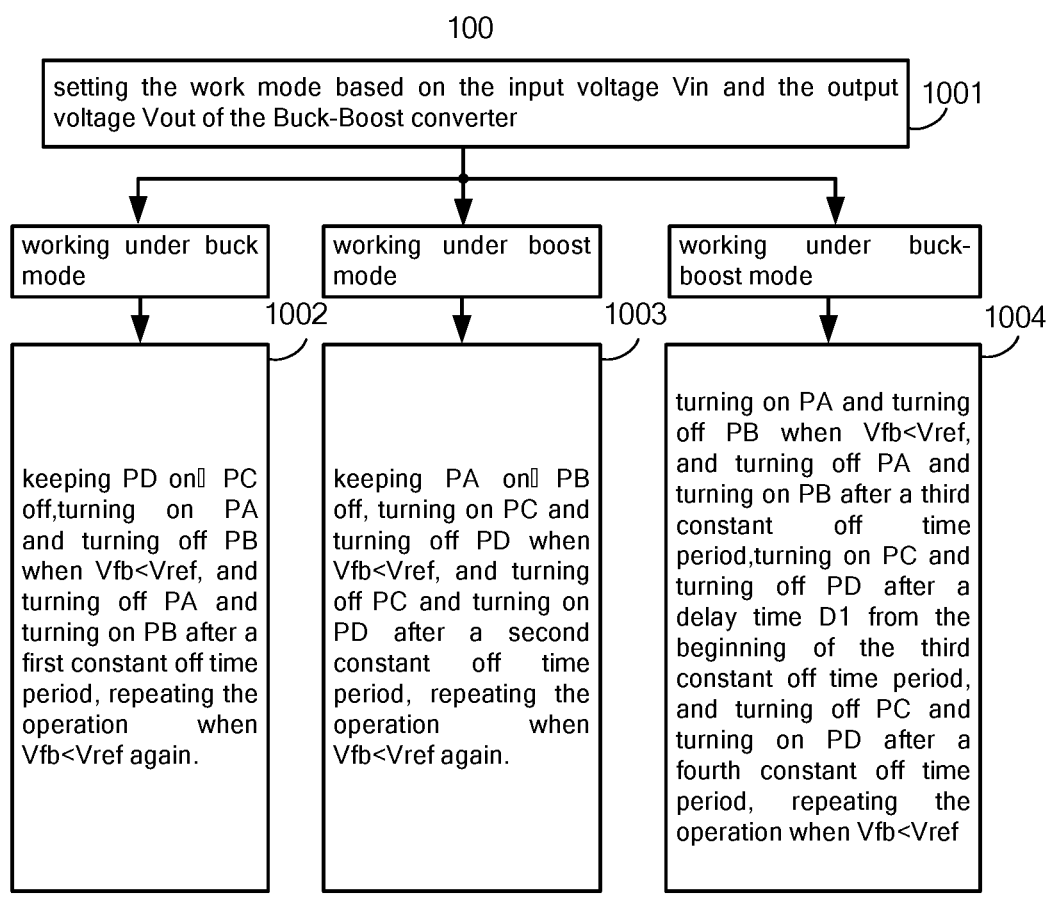
FIG. 15 shows a flow chart of a control method 110 for buck-boost converter in accordance with an embodiment of the present invention.

FIG. 15 shows a flow chart of a control method 110 for buck-boost converter in accordance with an embodiment of the present invention. The buck-boost converter may comprise the circuits in FIGS. 2, 3, 4, 8 and 12. The control method 110 comprises: step 1101, setting the work mode based on the input voltage Vin and the output voltage Vout of the buck-boost converter; step 1102, keeping the fourth power switch PD on and the third power switch PC off under buck mode, meanwhile: turning off the first power switch PA and turning on the second power switch PB when the feedback signal Vfb indicative of the output voltage Vout increases to a reference signal Vref, and keeping the states of the first power switch PA and second power switch PB unchanged for a first constant off time period; turning on the first power switch PA and turning off the second power switch PB after the first constant off time period; and repeating the operation when the feedback signal Vfb increases to the reference signal Vref again; step 1103, keeping the first power switch PA on and the second power switch PB off under boost mode, meanwhile: turning off the third power switch PC and turning on the fourth power switch PD when the feedback signal Vfb indicative of the output voltage Vout increases to the reference signal Vref, and keeping the states of the third power switches PC and the fourth power switches PD unchanged for a second constant off time period; turning on the third power switch PC and turning off the fourth power switch PD after the second constant off time period; and repeating the operation when the feedback signal Vfb increases to the reference signal Vref again; step 1104, turning off the first power switch PA and turning on the second power switch PB when the feedback signal Vfb indicative of the output voltage Vout increases to the reference signal Vref, and keeping the states of the first power switch PA and the second power switch PB unchanged for a third constant off time period, and meanwhile, the third power switch PC is off and the fourth power switch PD is on at this moment; turning off the third power switch PC and turning on the fourth power switch PD for a fourth constant off time period, and keeping the states of the third power switch PC and the fourth power switch PD unchanged for a fourth constant off time period; turning on the first power switch PA and turning off the second power switch PB after the third constant off time period; turning on the third power switch PC and turning off the fourth power switch PD after the fourth constant off time period; and repeating the operation when the feedback signal Vfb increases to the reference signal Vref again.

In one embodiment, the step 1101 comprises: entering the buck mode when the input voltage Vin is larger than the output voltage Vout; entering the boost mode when the input voltage Vin is smaller than the value of the output voltage Vout; entering the buck-boost mode when the input voltage Vin is close to the output voltage Vout.

In one embodiment, the fourth constant off time period begins from the beginning of the third constant off time period and ends after the ending of the third constant off time period.

The present invention provides buck-boost converter with simple structure. The buck-boost converter works with constant on time control or constant off time control, thus a loop compensation circuit may be saved so as to simplify the circuit and make the mode transition smooth. Furthermore, the buck-boost converter has good transient response and low output voltage ripple.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A buck-boost converter, comprising:
an input port configured to receive an input voltage;
an output port configured to provide an output voltage;
a pair of buck switches having a first power switch and a second power switch coupled in series between the input port and a ground reference;
a pair of boost switches having a third power switch and a fourth power switch coupled in series between the output port and the ground reference;
a mode select circuit configured to receive the input voltage and the output voltage, and based on the input voltage and the output voltage, the mode select circuit generates a buck enable signal, a boost enable signal and a buck-boost enable signal;
a mode control circuit configured to receive a feedback signal indicative of the output voltage, a reference signal, the buck enable signal, the boost enable signal and the buck-boost enable signal, and based on the feedback signal, the reference signal, the buck enable signal, the boost enable signal and the buck-boost enable signal, the mode control circuit generates a first buck control signal, a second buck control signal, a first boost control signal and a second boost control signal; and
a logic circuit configured to receive the first buck control signal, the second buck control signal, the first boost control signal and the second boost control signal, and based on the first buck control signal, the second buck control signal, the first boost control signal and the second boost control signal, the logic circuit generates a first switch control signal, a second switch control signal, a third switch control signal and a fourth switch control signal to respectively control the operation of the first power switch, the second power switch, the third power switch and the fourth power switch, so as to control the output voltage; wherein,
when the input voltage is in a range between the output voltage multiplied by K2 and the output voltage multiplied by K1, the buck-boost enable signal is valid, then the buck-boost converter works under buck-boost mode, wherein during each switching period, an on time period of the first power switch and an on time period of the third power switch are overlapped, but the on time period of the third power switch is shorter than the on time period of the first power switch, and wherein K1 and K2 are constant coefficients, and K1>1, 0<K2<1;
wherein the mode control circuit comprises:
a feedback comparator, having a first input terminal configured to receive the reference signal, a second input terminal configured to receive the feedback signal indicative of the output voltage, and an output terminal configured to provide a set signal based on the reference signal and the feedback signal;
a first RS flip-flop having a reset terminal configured to receive a reset signal, a set terminal coupled to the output terminal of the feedback comparator to receive the set signal, and an output terminal configured to provide a feedback control signal based on the set signal and the reset signal;
a first enable logic circuit having a first input terminal coupled to the output terminal of the first RS flip-flop to receive the feedback control signal, a second input terminal configured to receive the buck enable signal, and an output terminal configured to provide a first buck control signal based on the feedback control signal and the buck enable signal;
a second enable logic circuit having a first input terminal coupled to the output terminal of the first RS flip-flop to receive the feedback control signal, a second input terminal configured to receive the boost enable signal, and an output terminal configured to provide a first boost control signal based on the feedback control signal and the boost enable signal;
a third enable logic circuit having a first input terminal coupled to the output terminal of the first RS flip-flop to receive the feedback control signal, a second input terminal configured to receive the buck-boost enable signal, and an output terminal configured to provide a second buck control signal based on the feedback control signal and the buck-boost enable signal;

a first constant on time circuit having an input terminal coupled to the output terminal of the first enable logic circuit to receive the first buck control signal, and an output terminal configured to provide a first buck reset signal based on the first buck control signal, wherein the first buck reset signal has a first constant on time period during each switching period of the buck-boost converter;

a second constant on time circuit having an input terminal coupled to the output terminal of the second enable logic circuit to receive the first boost control signal, and an output terminal configured to provide a first boost reset signal based on the first boost control signal, wherein the first boost reset signal has a second constant on time period during each switching period of the buck-boost converter;

a third constant on time circuit having an input terminal coupled to the output terminal of the third enable logic circuit to receive the second buck control signal, and an output terminal configured to provide a second buck reset signal based on the second buck control signal, wherein the second buck reset signal has a third constant on time period during each switching period of the buck-boost converter;

a delay circuit having an input terminal coupled to the output terminal of the third enable logic circuit to receive the second buck control signal, and an output terminal configured to provide a delay signal being delayed for a preset time length compared to the second buck control signal;

a second RS flip-flop having a set terminal coupled to the output terminal of the delay circuit to receive the delay signal, and an output terminal configured to provide a second boost control signal;

a fourth constant on time circuit having an input terminal coupled to the output terminal of the second RS flip-flop to receive the second boost control signal, and an output terminal configured to provide a second boost reset signal based on the second boost control signal, wherein the second boost reset signal has a fourth constant on time period during each switching period of the buck-boost converter; and a reset logic circuit having a first input terminal coupled to the output terminal of the first constant on time circuit to receive the first buck reset signal, a second input terminal coupled to the output terminal of the second constant on time circuit to receive the first boost reset signal, a third input terminal coupled to the output terminal of the constant on time circuit to receive the second buck reset signal, and an output terminal configured to provide the reset signal based on the first buck reset signal, the second buck reset signal and the first boost reset signal; wherein the second RS flip-flop further has a reset terminal coupled to the output terminal of the fourth constant on time circuit to receive the second boost reset signal.

2. The buck-boost converter of claim 1, wherein the fourth constant on time period begins after the beginning of the third constant on time period, and ends before the ending of the third constant on time period.

3. A control circuit for a buck-boost converter, wherein the buck-boost converter comprises an input port receiving an input voltage, an output port providing an output voltage, a first power switch, a second power switch, a third power switch and a fourth power switch, the control circuit comprising:

a mode select circuit configured to receive the input voltage and the output voltage, and based on the input voltage and the output voltage, the mode select circuit generates a buck enable signal, a boost enable signal and a buck-boost enable signal;

a mode control circuit configured to receive a feedback signal indicative of the output voltage, a reference signal, the buck enable signal, the boost enable signal and the buck-boost enable signal, and based on the feedback signal, the reference signal, the buck enable signal, the boost enable signal and the buck-boost enable signal, the mode control circuit generates a first buck control signal, a second buck control signal, a first boost control signal and a second boost control signal; and a logic circuit configured to receive the first buck control signal, a second buck control signal, a first boost control signal and a second boost control signal, and based on the buck control signals and the boost control signals, the logic circuit generates a first switch control signal, a second switch control signal, a third switch control signal and a fourth switch control signal to respectively control the operation of the first power switch, the second power switch, the third power switch and the fourth power switch, so as to control the output voltage; wherein:

when the input voltage is in a range between the output voltage multiplied by K2 and the output voltage multiplied by K1, the buck-boost enable signal is valid, then the buck-boost converter works under buck-boost mode, wherein during each switching period, an on time period of the first power switch and an on time period of the third power switch are overlapped, but the on time period of the third power switch is shorter than the on time period of the first power switch, and wherein K1 and K2 are constant coefficients, and K1>1, 0<K2<1; wherein the mode control circuit comprises:

a feedback comparator, having a first input terminal configured to receive the reference signal, a second input terminal configured to receive the feedback signal indicative of the output voltage, and an output terminal configured to provide a set signal based on the reference signal and the feedback signal;

a first RS flip-flop having a reset terminal configured to receive a reset signal, a set terminal coupled to the output terminal of the feedback comparator to receive the set signal, and an output terminal configured to provide a feedback control signal based on the set signal and the reset signal;

a first enable logic circuit having a first input terminal coupled to the output terminal of the first RS flip-flop to receive the feedback control signal, a second input terminal configured to receive the buck enable signal, and an output terminal configured to provide a first buck control signal based on the feedback control signal and the buck enable signal;

a second enable logic circuit having a first input terminal coupled to the output terminal of the first RS flip-flop to receive the feedback control signal, a second input terminal configured to receive the boost enable signal, and an output terminal configured to provide a first boost control signal based on the feedback control signal and the boost enable signal;

a third enable logic circuit having a first input terminal coupled to the output terminal of the first RS flip-flop to receive the feedback control signal, a second input terminal configured to receive the buck-boost enable signal, and an output terminal configured to provide a second buck control signal based on the feedback control signal and the buck-boost enable signal;

a first constant on time circuit having an input terminal coupled to the output terminal of the first enable logic circuit to receive the first buck control signal, and an output terminal configured to provide a first buck reset signal based on the first buck control signal, wherein the first buck reset signal has a first constant on time period during each switching period of the buck-boost converter;

a second constant on time circuit having an input terminal coupled to the output terminal of the second enable logic circuit to receive the first boost control signal, and an output terminal configured to provide a first boost reset signal based on the first boost control signal, wherein the first boost reset signal has a second constant on time period during each switching period of the buck-boost converter;

a third constant on time circuit having an input terminal coupled to the output terminal of the third enable logic circuit to receive the second buck control signal, and an output terminal configured to provide a second buck reset signal based on the second buck control signal, wherein the second buck reset signal has a third constant on time period during each switching period of the buck-boost converter;

a delay circuit having an input terminal coupled to the output terminal of the third enable logic circuit to receive the second buck control signal, and an output terminal configured to provide a delay signal being delayed for a preset time length compared to the second buck control signal;

a second RS flip-flop having a set terminal coupled to the output terminal of the delay circuit to receive the delay signal, and an output terminal configured to provide a second boost control signal;

a fourth constant on time circuit having an input terminal coupled to the output terminal of the second RS flip-flop to receive the second boost control signal, and an output terminal configured to provide a second boost reset signal based on the second boost control signal, wherein the second boost reset signal has a fourth constant on time period during each switching period of the buck-boost converter; and a reset logic circuit having a first input terminal coupled to the output terminal of the first constant on time circuit to receive the first buck reset signal, a second input terminal coupled to the output terminal of the second constant on time circuit to receive the first boost reset signal, a third input terminal coupled to the output terminal of the constant on time circuit to receive the second buck reset signal, and an output terminal configured to provide the reset signal based on the first buck reset signal, the second buck reset signal and the first boost reset signal; wherein the second RS flip-flop further has a reset terminal coupled to the output terminal of the fourth constant on time circuit to receive the second boost reset signal.

4. The control circuit of claim 3, wherein the fourth constant on time period begins after the beginning of the third constant on time period, and ends before the ending of the third constant on time period.

5. A control circuit for a buck-boost converter, wherein the buck-boost converter comprises an input port receiving an input voltage, an output port providing an output voltage, a first power switch, a second power switch, a third power switch and a fourth power switch, the control circuit comprising:

a mode select circuit configured to receive the input voltage and the output voltage, and based on the input voltage and the output voltage, the mode select circuit generates a buck enable signal, a boost enable signal and a buck-boost enable signal;

a mode control circuit configured to receive a feedback signal indicative of the output voltage, a reference signal, the buck enable signal, the boost enable signal and the buck-boost enable signal, and based on the feedback signal, the reference signal, the buck enable signal, the boost enable signal and the buck-boost enable signal, the mode control circuit generates a first buck control signal, a second buck control signal, a first boost control signal and a second boost control signal; and a logic circuit configured to receive the first buck control signal, a second buck control signal, a first boost control signal and a second boost control signal, and based on the buck control signals and the boost control signals, the logic circuit generates a first switch control signal, a second switch control signal, a third switch control signal and a fourth switch control signal to respectively control the operation of the first power switch, the second power switch, the third power switch and the fourth power switch, so as to control the output voltage; wherein:

when the input voltage is in a range between the output voltage multiplied by K2 and the output voltage multiplied by K1, the buck-boost enable signal is valid, then the buck-boost converter works under buck-boost mode, wherein during each switching period, an on time period of the first power switch and an on time period of the third power switch are overlapped, but the on time period of the third power switch is shorter than the on time period of the first power switch, and wherein K1 and K2 are constant coefficients, and K1>1, 0<K2<1; wherein the mode control circuit comprises:

a feedback comparator, having a first input terminal configured to receive the reference signal, a second input terminal configured to receive the feedback signal indicative of the output voltage, and an output terminal configured to provide a reset signal based on the reference signal and the feedback signal;

a first RS flip-flop having a reset terminal coupled to the output terminal of the feedback comparator to receive the reset signal, a set terminal configured to receive a set signal, and an output terminal configured to provide a feedback control signal based on the set signal and the reset signal;

a first enable logic circuit having a first input terminal coupled to the output terminal of the first RS flip-flop to receive the feedback control signal, a second input terminal configured to receive the buck enable signal, and an output terminal configured to provide a first buck control signal based on the feedback control signal and the buck enable signal;

a second enable logic circuit having a first input terminal coupled to the output terminal of the first RS flip-flop to receive the feedback control signal, a second input terminal configured to receive the boost enable signal, and an output terminal configured to provide a first boost control signal based on the feedback control signal and the boost enable signal;

a third enable logic circuit having a first input terminal coupled to the output terminal of the first RS flip-flop to receive the feedback control signal, a second input terminal configured to receive the buck-boost enable signal, and an output terminal configured to provide a second buck control signal based on the feedback control signal and the buck-boost enable signal;

a first constant off time circuit having an input terminal coupled to the output terminal of the first enable logic circuit to receive the first buck control signal, and an output terminal configured to provide a first buck set signal based on the first buck control signal, wherein the first buck set signal has a first constant off time period during each switching period of the buck-boost converter;

a second constant off time circuit having an input terminal coupled to the output terminal of the second enable logic circuit to receive the first boost control signal, and an output terminal configured to provide a first boost set signal based on the first boost control signal, wherein the first boost set signal has a second constant off time period during each switching period of the buck-boost converter;

a third constant off time circuit having an input terminal coupled to the output terminal of the third enable logic circuit to receive the second buck control signal, and an output terminal configured to provide a second buck set signal based on the second buck control signal, wherein the second buck set signal has a third constant off time period during each switching period of the buck-boost converter;

a second RS flip-flop having a reset terminal coupled to the output terminal of the third enable logic circuit to receive the second buck control signal, and an output terminal provides a second boost control signal; and a fourth constant off time circuit having an input terminal coupled to the output terminal of the second RS flip-flop to receive the second boost control signal, and an output terminal configured to provide a boost set signal based on the second boost control signal, wherein the second boost set signal has a fourth constant off time period during each switching period of the buck-boost converter; and a set logic circuit having a first input terminal coupled to the output terminal of the first constant off time circuit to receive the first buck set signal, a second input terminal coupled to the output terminal of the second constant off time control circuit to receive the first boost set signal, a third input terminal coupled to the output terminal of the third constant off time circuit to receive the second buck set signal, and an output terminal configured to provide the set signal based on the first buck set signal, the second buck set signal and the first boost set signal; wherein the second RS flip-flop further having a set terminal coupled to the output terminal of the fourth constant off time circuit to receive the second boost set signal.

6. The control circuit of claim 5, wherein the fourth constant off time period begins from the beginning of the third constant off time period, and ends after the ending of the third constant off time period.

* * * * *